United States Patent [19]

Balzer

[11] Patent Number: 4,781,207

[45] Date of Patent: Nov. 1, 1988

[54] PROCESS FOR THE TRANSPORTATION OF VISCOUS OILS

[75] Inventor: Dieter Balzer, Haltern, Fed. Rep. of Germany

[73] Assignee: Huels Aktiengesellschaft, Marl, Fed. Rep. of Germany

[21] Appl. No.: 28,633

[22] Filed: Mar. 20, 1987

[30] Foreign Application Priority Data

Mar. 21, 1986 [DE] Fed. Rep. of Germany ....... 3609641

[51] Int. Cl.$^4$ ............................................. F17D 1/17
[52] U.S. Cl. .................................. 137/13; 252/8.551; 252/312; 252/354
[58] Field of Search ..................... 252/8.551, 312, 354; 137/13

[56] References Cited

U.S. PATENT DOCUMENTS

| | | | |
|---|---|---|---|
| 2,183,853 | 12/1939 | Haussmann et al. ................ | 260/404 |
| 3,467,195 | 9/1969 | McAuliffe et al. .......... | 252/8.551 X |
| 3,491,835 | 1/1970 | Gagle ..................................... | 137/13 |
| 4,249,554 | 2/1981 | McClaflin .................... | 252/8.551 X |
| 4,265,264 | 5/1981 | Sifferman ..................... | 252/8.551 X |
| 4,285,356 | 8/1981 | Sifferman ..................... | 252/8.551 X |
| 4,457,373 | 7/1984 | Balzer et al. ...................... | 252/8.554 |
| 4,478,281 | 10/1984 | Balzer et al. ................. | 252/8.554 X |
| 4,485,873 | 12/1984 | Balzer et al. ................. | 252/8.554 X |

Primary Examiner—Herbert B. Guynn
Attorney, Agent, or Firm—Millen & White

[57] ABSTRACT

The object of the invention is a process for the transportation of heavy oil whereby an oil-in-water emulsion containing an emulsifier, with at least 10–15% of water is transported and subsequently separated again into crude oil and water. The emulsifier employed is a carboxymethylated oxalkylate of the formula

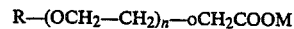
$$R-(OCH_2-CH_2)_n-OCH_2COOM$$

and ether sulfate of the formula

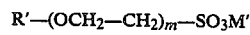
$$R'-(OCH_2-CH_2)_m-SO_3M'$$

in which R and also R' mean a saturated or unsaturated linear or branched aliphatic radical with 8 to 20 carbon atoms, an alkyl aromatic radical with 4 to 16 carbon atoms, an alkyl aromatic radical with 4 to 16 carbon atoms or a di- or tri-alkyl aromatic radical with a total of 5 to 20 and 7 to 24 carbon atoms respectively in the alkyl groups, m means 1 to 40, n means 1 to 40 and M and M' mean an alkali or alkaline-earth metal ion or ammonium.

17 Claims, No Drawings

PROCESS FOR THE TRANSPORTATION OF VISCOUS OILS

BACKGROUND OF THE INVENTION

Under conditions of usual outside temperatures heavy oils and extra-heavy oils can be transported in pipelines only with difficulty because of their very high viscosity. Therefore, to increase their mobility they are often mixed with low-viscosity crude oils or refinery cuts; such a mode of operation requires relatively great quantities of additives to achieve an appreciable improvement in flow. Moreover, such a procedure is efficient only where light-oil fields exist in the same locality or a nearby refinery is able to deliver low-viscosity gasoline fractions.

Another method also used consists in feeding heat to the heavy oil to lower its viscosity and correspondingly to improve its flow; for which considerable amounts of heat must be expended. Thus, it is necessary, e.g., to heat a heavy oil of 10.3° API, whose viscosity at 20° C. is 40,000 mPa to a temperature of about 95° C. to attain a viscosity of about 100 mPa, a threshold value often required for oil transportation in pipelines (M. L. Chirinos et al., Rev. Tec. Intevep. 3 (2):103 [1983]). This requires a high expenditure for equipping and maintaining the pipelines, and a loss of 15 to 20% in crude oil, since the necessary amount of heat is usually obtained by combustion of crude oil.

Another method for heavy oil transport resides in pumping the oil through the pipelines in a more or less readily fluid emulsion. Since the viscosity of emulsions is determined predominantly by the dispersing agent, here an oil-in-water emulsion is involved. The oil-in-water emulsion is obtained by adding water and emulsifier to the oil using shear forces. This mixture is then pumped into the pipeline. In a settling tank, the emulsion is again separated into oil and water and the separated oil is fed to the refinery. The emulsifier should, in as small a concentration as possible, result in stable readily fluid oil-in-water with a very high proportion of oil. This poses great demands on the emulsifiers used. High shear forces are also to be avoided during emulsification, since in the case of heavy oils there is a danger of an inversion to an extremely highly viscous water-in-oil emulsion. Moreover, the emulsions are to be stable both in regard to higher salinities which occur in many field systems, and in regard to high temperatures. Despite the adequate stability of the emulsions during flow through the pipeline, it should be possible to separate them again as easily as possible.

The emulsifiers proposed so far still do not adequately meet said conditions. In many cases (e.g., U.S. Pat. Nos. 4,285,356, 4,265,264 and 4,249,554), emulsions with oil contents of only 50% are mentioned, which means that for oil transportation half of the pipeline must be sacrificed. In other cases (e.g., Canadian specification Nos. 1,108,205, 1,113,529, 1,117,568, and U.S. Pat. No. 4,246,919), lowering of the viscosity, achieved by addition of emulsifier, is not very great despite the relatively small portion of oil.

SUMMARY OF THE INVENTION

Therefore, it is an object of the invention to provide highly effective emulsifiers (largely independent of salinity), for emulsifying of heavy oil in water in oil transport in production lines and/or in pipelines.

Upon further study of the specification and appended claims, further objects and advantages of this invention will become apparent to those skilled in the art.

These objects are attained by provision of a process for the transportation of viscous oils through a pipeline in the form of an oil-in-water emulsion, from crude oil, preferably at least 10 to 15% water, and an emulsifier, which afterwards may again be separated into crude oil and water, characterized in that there is used as the emulsifier a mixture of (1) a carboxymethylated oxethylate of the formula

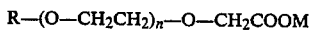

$$R-(O-CH_2CH_2)_n-O-CH_2COOM$$

in which R means a linear or branched aliphatic radical with 8 to 20 carbon atoms, an alkyl aromatic radical with 4 to 16 carbon atoms in the alkyl group, a dialkyl aromatic radical with a total of 5 to 20 carbon atoms in the alkyl groups or a trialkyl aromatic radical with a total of 7 to 24 carbon atoms in the alkyl groups, n means 1 to 40 and M means an alkali or alkaline-earth metal ion or ammonium, and (2) an ether sulfate of the formula

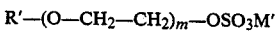

$$R'-(O-CH_2-CH_2)_m-OSO_3M'$$

in which R' means a linear or branched aliphatic radical with 8 to 20 carbon atoms, an alkyl aromatic radical with 4 to 16 carbon atoms in the alkyl group, a dialkyl aromatic radical with a total of 5 to 20 carbon atoms in the alkyl groups or a trialkyl aromatic radical with a total of 7 to 24 carbon atoms in the alkyl groups, m means 1 to 40 and M' means an alkali metal, an alkaline-earth metal ion or ammonium.

DETAILED DISCUSSION

Advantageously, the carboxymethylated oxalkylates are produced by reaction of oxalkylates of the formula

$$R(O-CH_2CH_2)_n-OH$$

with chloroacetic acid or a salt of chloroacetic acid in the presence of alkali metal hydroxide or alkaline-earth metal hydroxide, according to DE-PS No. 24 18 444, which disclosure is incorporated by reference herein. But other production processes are also suitable. These emulsifiers are the subject of several other oil-related uses disclosed in commonly assigned U.S. Pat. Nos. 4,478,281, 4,457,373, 4,542,790, 4,563,318 and 4,485,873, all of which disclosures are incoporated by reference herein. R preferably is a hydrocarbon saturated or unsaturated, straight-chain or branched alkyl or alkenyl radical with 8-18 C atoms or hydrocarbon alkylaryl radical with 5 to 16 C atoms in the alkyl group or a hydrocarbon dialkylaryl radical with a total of 6 to 22 carbon atoms in the alkyl groups or a trialkylaryl radical with a total of 7 to 24 carbon atoms in the alkyl groups. The aryl residue generally has 6-10 C atoms, e.g., phenyl or naphthyl. As alcohols whose oxethylates are carboxymethylated, there can be used, e.g., hexyl alcohol, octyl alcohol, 2-ethylhexyl alcohol, nonyl alcohol, isononyl alcohol, decyl and undecyl alcohol, lauryl, tridecyl, myristyl, palmityl and stearyl alcohol, and also unsaturated alcohols such as, e.g., oleyl alcohol. Commercial mixtures of these alcohols can also be suitable. As alkyl phenols can include, e.g., pentyl phenol, hexyl phenol, octyl phenol, nonyl phenyl, dodecyl phenol, hexadecyl phenol, as also the corresponding di- and tri-alkyl phenols, e.g., dibutyl- and dibutyl phenol. Alkyl cresols and alkyl xylenes or tributyl and tripentyl phenols are also suitable.

These alcohols or alkyl phenols are oxethylated according to known processes, whereby the degree of oxethylation can receive a value of 1 to 40, preferably 3 to 20. The cation in the carboxymethylated oxethylate with the formula $$R-(O-CH_2CH_2)_n-O-CH_2-COOM$$

n being sodium, potassium, lithium, ammonium, calcium, magnesium or hydrogen, etc.

The carboxymethylated oxethylates are anionic surfactants, therefore, the stabilized emulsion can be broken without any problems. The compounds are stable thermally and compatible with salt-containing water within extremely wide limits (U.S. Pat. No. 4,457,373, which disclosure is incorporated by reference herein). Furthermore, they permit optimum adaptation of the emulsifier to the oil to be transported and to the given salinity of the water entrained in most cases from the deposit, by varying the hydrophobic alkyl residue, the degree of propoxylation, and the degree of oxethylation. The mentioned deposit water suitably forms the aqueous phase of the emulsions to be transported.

Depending on their production, the emulsifiers contain unreacted oxethylates, in other words, nonionic surfactants. A degree of carboxymethylation can be defined. The formulae $$R-(O-CH_2-CH_2)_n-O-CH_2-COOM$$
and
$$R-(O-CH_2CH_2)_n-OH$$

therefore be used to characterize a mixture containing different amounts of unreacted oxethylate, provided the degree of carboxymethylation is less than 100%. Mixtures or compounds with a degree of carboxymethylation (i.e., content of compounds of the first formula) of 50 to 100% by weight, preferably 85 to 100% by weight, are particularly effective. Such mixtures or compounds are considered as "carboxymethylated oxethylates" according to this invention.

The described compounds are compatible with saline water within a wide range, whereby alkaline-earth metal ion concentrations do not have a detrimental effect. The carboxymethylated oxethylates, adjusted in regard to their chemical structure to the respective heavy oil-water system, are often highly effective as emulsifiers in concentrations between 300 and 500 ppm, partially even below that.

Suitable ether sulfates are those of the general formula $$R'O(CH_2CH_2-O)_m-SO_4M',$$

wherein R' is preferably a saturated or unsaturated, straight-chain or branched alkyl or alkenyl radical with 8 to 20 C atoms or hydrocarbon alkylaryl radical with 5 to 16 C atoms in the alkyl group or a hydrocarbon dialkylaryl radical with a total of 6 to 22 C atoms in the alkyl groups or a hydrocarbon trialkyl radical with a total of 7 to 24 C atoms in the alkyl groups, m is preferably 1 to 10, and M' is preferably sodium.

Lit.: Ullmanns Encyyklopädie der technischen Chemie, 4. Auflage, Vol. 22, pages 486-487.

The emulsifying effectiveness optimized in each case on a homologous series (varying degree of ethylene oxide) in the case of ether sulfates, which were produced according to the usual processes, as a function of the heavy oil-water system, is in part weaker and in part stronger than that of the analogously optimized carboxymethylated oxethylates. The emulsifying effectiveness depends on the minimum concentration of the emulsifier (in relation to the amount of oil) which for at least 24 hours results in an approximately stable emulsion. The two classes of surfactants each usually show a more or less marked dependence of their emulsifying effectiveness on the salinity of the oil-water system. Higher salinities often result in more favorable concentrations. The minimum emulsifier concentrations can be relatively high in the presence of low salt contents.

In current heavy oil recovery, processes are often used with application of steam, whereby the usually saline formation water is diluted by the condensing vapors, and a certain fluctuation of the salinity is experienced. The surfactant mixtures to be used according to the invention, therefore, prove to be excellently suited, since their effectiveness as emulsifiers is largely independent of the system salinity.

The ratio of each of the two types of surfactants in the mixture can fluctuate within broad limits and be 10:1 to 1:10, and is preferably 3:1 to 1:3, especially 2:1 to 1:2.

The surfactant mixture to be used can optimally be adjusted for the given heavy oil-water system by preliminary tests. This can take place, e.g., by optimizing the two surfactants individually within the framework of a homologous series in regard to their chemical structure for the highest salinity contemplated, as described in the attached examples.

For this purpose, the surfactants can be dissolved in the water in question and mixed with the heavy oil in question. After short-time stirring with a blade agitator and without great shear force, the surfactants can be tested for their emulsifying action, wherein the stability of the emulsion is determined. This assessment of the emulsion can be repeated about 24 hours later, and then optionally the viscosity can be measured as a function of the shearing rate. Since heavy oil emulsions generally have a slight structural viscosity, a range between 10 and 100 sec$^{-1}$ is usually selected for the shear rate as it corresponds approximately to transport through pipelines. A surfactant is an optimal emulsifier, if the amount necessary for emulsification is minimal.

The amount of emulsifier is generally 0.01 to 0.5% by weight, especially 0.03-0.2% by weight, in relation to the amount of oil. This corresponds to 100 to 5,000, preferably 300-2,000 ppm. The emulsifier is, e.g., metered as a melt or as an aqueous solution or as a dispersion to the oil-water mixture, or it can be added to water, which is then mixed with the oil. By water is understood here a more or less saline water which is produced together with the heavy oil. Also an inexpensively available surface water or a mixture of the waters can be used.

Instead of metering the emulsifier into the water, it can also be added to the heavy oil itself, especially since the surfactant mixtures claimed here show good oil solubility. It can possibly be advantageous to use a small amount of highly fluid hydrocarbon mixture as a solubilizer. Mixing of the three components to form the emulsion, namely oil, water, and emulsifier, can take place either directly in the well or near a collecting tank, or at any other point of the pipeline system.

A variant of the process includes injecting an emulsifying solution or emulsifying dispersion into the bottom part of the exploitation well to facilitate the flow of the heavy oil in the production pipeline. This process variant is recommended especially in the case of a low gas-oil ratio. Viscous oils for use in this invention include all which are not of sufficiently low viscosity for satisfactory transport in a pipeline. This invention is applicable to all oil compositions and is effective over the full range of salinities encountered in the field, e.g., 0–25% by weight of the usual salt, e.g., alkali metal and alkaline earth metal salts.

The mixture ratio by weight of oil to water can vary widely, e.g., from 10:90 to 90:10. High oil contents are desirable for economical reasons, although it should be noted that very high contents can also result in relatively highly viscous oil/water emulsions and promote a phase inversion which should be avoided. The economical optimum, depending on the system, is in an oil content 70 to 85% by weight, e.g., preferably at least about 30–15% by weight of water.

By "heavy" oil herein is meant oil of 5°–15° API gravity.

Temperatures at which the emulsifiers are particularly effect are between 10°–60° C., preferable 15°–40° C.

Emulsification is promoted by mixing devices such as stirrers, centrifugal pumps, static mixers, etc., which can be used if necessary. The emulsion formed is delivered by the pipeline system, which optionally can contain intermediate stations and interposed storage tanks. At the pipeline terminal, the emulsion is conventioanlly demulsified in a separator, whereby it can be advantageous to add one or more demulsifiers. The crude oil thus dewatered is drawn off and then fed either to the refinery or to a possible further transportation, e.g., by ship. According to the invention, heavy oils to be emulsified and transported are, e.g., those with an API of less than 18°.

Unless indicated otherwise herein, all details of the emulsification, transport and demulsification are conventional, e.g., as disclosed in M. L. Mao and S. S. Marsden, *The Journal of Canadian Petroleum Technology*, 1977, Apr.-June, pg. 521, which disclosure is incorporated by reference herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE

In a glass vessel or polyethylene beaker of about 200-ml capacity, 75 g of heavy oil and 25 g of said aqueous surfactant solution, which moreover contains neutral electrolyte, are stirred with one another with a simple blade agitator (about 100 revolutions per minute). If the added surfactant is effective and its amount sufficient, a homogeneously appearing emulsion is formed. Then the mixture is allowed to stand for 24 hours at room temperature and again the homogeneity of the mixture is examined, whereby—if necessary—it is stirred a little with a glass rod. If an easy-flowing homogeneous emulsion has formed, then the viscosity—as already described—is measured. The minimum emulsifier concentration is recorded (percent by weight in relation to the amount of oil) of the surfactant in question, which is necessary for an approximately stable emulsion. "Approximately stable" here means that even a slight stirring with the glass rod is sufficient to reestablish the original homogeneity, if this was lost at all.

Two Venezuelan crude oils were used as heavy oils: Boscan oil (about 10° API, viscosity at 20° C. 180,000 mPa, setting point 7° C) and CN oil (about 8° API, viscosity at 20° C. about 3,000,000 mPa, setting point 18° C.).

The great effectiveness of carboxymethylated oxethylates and that of the ether sulfates as emulsifiers for (very) heavy oil-in-water emulsions is shown by the examples summarized in the following tables. It is further demonstrated that the mixtures of the two classes of surfactants, especially in the case of low-saline water, have a strongly synergistic effect. The minimum emulsifier concentration in the case of the surfactant mixtures is almost independent of the salinity of the water in the case of the two crude oil systems.

TABLE A

Minimum emulsifier concentration $C_{min}$ (%) for 1:1 mixtures of carboxymethylated oxethylate and ether sulfate in comparison to the individual substances as a function of salinity. Oil Boscan, o/w = 3, carboxymethylated nonyl phenol oxethylate sodium salt with 6 mol of ethylene oxide/mol (A) and nonyl phenol ether sulfate Na with 4 mol or EO/mol (B), viscosity at 20° C.

| Example No. | Salinity (% NaCl) | A $C_{min}$ (%) | A Eta (mPa) | B $C_{min}$ (%) | B Eta (mPa) | 1:1 mixture $C_{min}$ (%) | 1:1 mixture Eta (mPa) |
|---|---|---|---|---|---|---|---|
| 1 | 0.5 | 0.5 | (110) | 0.15 | (200) | 0.02 | (130) |
| 2 | 1 | 0.4 | (90) | 0.1 | (250) | 0.03 | (160) |
| 3 | 2 | 0.05 | (80) | 0.15 | (300) | 0.05 | (150) |
| 4 | 3.5 | 0.03 | (120) | 0.15 | | 0.05 | (100) |
| 5 | 5 | 0.03 | (150) | 0.1 | (140) | 0.05 | (110) |

TABLE B

Minimum emulsifier concentration $C_{min}$ (%) for 1:1 mixtures of carboxymethylated oxethylate and ether sulfate in comparison to the individual substances as a function of salinity. Oil CN, o/w = 3, carboxymethylated nonyl phenol oxethylate sodium salt with 10 mol of ethylene oxide/mol (C) and nonyl phenol ether sulfate Na with 5 mol of EO/mol (D) viscosity at 40° C.

| Example No. | Salinity (% NaCl) | C $C_{min}$ (%) | C Eta (mPa) | D $C_{min}$ (%) | D Eta (mPa) | 1:1 mixture $C_{min}$ (%) | 1:1 mixture Eta (mPa) |
|---|---|---|---|---|---|---|---|
| 6 | 0.5 | 0.4 | (80) | 0.5 | | 0.075 | (60) |
| 7 | 1 | 0.3 | (50) | 0.3 | (120) | 0.075 | (60) |
| 8 | 2 | 0.2 | (110) | 0.1 | (140) | 0.05 | (70) |
| 9 | 3.5 | 0.1 | (90) | 0.1 | | 0.05 | (60) |
| 10 | 5 | 0.05 | (70) | 0.075 | (140) | 0.05 | (70) |

TABLE C

Minimum emulsifier concentration $C_{min}$ (%) for 1:1 mixtures of carboxymethylated oxethylate and ether sulfate in comparison to the individual substances as a function of salinity. Oil CN, o/w = 3, carboxymethylated dodecyl phenol oxethylate sodium salt with 8 mol of ethylene oxide/mol (E) and nonyl phenol ether sulfate Na with 5 mol of EO/mol (D) viscosity at 40° C.

| Example No. | Salinity (% NaCl) | E $C_{min}$ (%) | E Eta (mPa) | D $C_{min}$ (%) | D Eta (mPa) | 1:1 mixture $C_{min}$ (%) | 1:1 mixture Eta (mPa) |
|---|---|---|---|---|---|---|---|
| 11 | 0.5 | 0.4 | | 0.4 | | 0.05 | (80) |

TABLE C-continued

Minimum emulsifier concentration $C_{min}$ (%) for 1:1 mixtures of carboxymethylated oxethylate and ether sulfate in comparison to the individual substances as a function of salinity. Oil CN, o/w = 3, carboxymethylated dodecyl phenol oxethylate sodium salt with 8 mol of ethylene oxide/mol (E) and nonyl phenol ether sulfate Na with 5 mol of EO/mol (D) viscosity at 40° C.

| Ex-ample No. | Salinity (% NaCl) | E $C_{min}$ (%) | E Eta (mPa) | D $C_{min}$ (%) | D Eta (mPa) | 1:1 mixture $C_{min}$ (%) | 1:1 mixture Eta (mPa) |
|---|---|---|---|---|---|---|---|
| 12 | 1 | 0.4 | | 0.3 | (120) | 0.05 | (120) |
| 13 | 2 | 0.25 | (200) | 0.1 | (140) | 0.05 | (150) |
| 14 | 3.5 | 0.1 | (150) | 0.1 | (110) | 0.05 | |
| 15 | 5 | 0.075 | (140) | 0.1 | (200) | 0.05 | (100) |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for transporting of a viscous heavy crude oil through a pipeline comprising forming an oil-in-water emulsion of said crude oil by mixing said oil with water and an emulsifier which is
   (1) 10-90% by weight of a carboxymethylated oxalkylate of the formula $$R-(O-CH_2-CH_2)_n-O-CH_2COOM$$

wherein
   R is ($C_{4-16}$ alkyl)phenyl,
   n is 1 to 40, and
   M is an alkali metal or alkaline earth metal ion or ammonium, and
   (2) 90-10% by weight of an ether sulfate of the formula $$R'-(O-CH_2-CH_2)_m-OSO_3M'$$

wherein R', M' and m are independently chosen from the groups defined for R, M and n, respectively, and
   transporting said oil-in-water emulsion through said pipeline.

2. A process according to claim 1, wherein the emulsifier comprises 33-66% by weight of the carboxymethylated oxalkylate and 66-33% by weight of either sulfate.

3. A process according to claim 1, wherein the emusifier concentration, based on the amount of oil, is 0.01-0.5% by weight.

4. A process of claim 1, wherein the amount of crude oil in the emulsion is 50-85 wt. %.

5. A process of claim 1, wherein n is 3-20.

6. A process of claim 1, wherein the water in the emulsion is saline water.

7. A process of claim 1, further comprising, after the transporting step, breaking down the emulsion into separated crude oil and water.

8. A process according to claim 1, wherein component (1) of the emusifier further comprises 0-50% by weight of an ethoxylate of the formula $$R-(OCH_2CH_2)_n-OH.$$

9. A process of claim 1, wherein the amount of water in the emulsion is at least about 10% by weight.

10. A process of claim 9, wherein the emulsifier concentration is 0.03-0.2% by weight.

11. A process of claim 1, wherein the heavy oil has a viscosity at 20° C. of at least about 180,000 mPa(s).

12. A process of claim 1, wherein the heavy oil has a gravity of 8-10° API.

13. A pipeline-transportable oil-in-water emulsion comprising 70-90% by weight of heavy crude oil, water and 0.01 to 0.5% by weight, based on the amount of oil, of an emulsifier which is
    (1) 10-90% by weight of a carboxymethylated ethoxylate of the formula $$R-(O-CH_2-CH_2)_n-O-CH_2-COOM$$

wherein
    R is ($C_{4-16}$-alkyl)phenyl
    n is 1 to 40 and
    M is an alkali metal or alkaline earth metal cation or ammonium, and
    (2) 90-10% by weight of an ether sulfate of the formula $$R'-(O-CH_2-CH_2)_m-OSO_3M'$$

wherein R', M' and m are each independently chosen from the groups defined for R, M and n, respectively.

14. An emulsion of claim 13, wherein the amount of emulsifier is 0.03-0.2 wt. %.

15. An emulsion according to claim 13, wherein component (1) of the emulsifier further comprises 0-50% by weight of an ethoxylate of the formula $$R-(OCH_2CH_2)_n-OH.$$

16. A combination of emulsifiers for preparing a viscous crude oil emulsion comprising
    (1) 10-90% by weight of a carboxymethylated ethoxylate of the formula $$R-(O-CH_2-CH_2)_n-O-CH_2-COOM$$

wherein
    R is ($C_{4-16}$-alkyl)phenyl
    n is 1 to 40 and
    M is an alkali metal or alkaline earth metal cation or ammonium
    (2) 90-10% by weight of an ether sulfate of the formula $$R'-(O-CH_2CH_2)_M-OSO_3M'$$

wherein R', M' and m are each independently chosen from the groups defined for R, M and m, respectively.

17. A combination according to claim 16, wherein component (1) of the emulsifier further comprises 0-50% by weight of an ethoxylate of the formula $$R-(OCH_2CH_2)_n-OH.$$

* * * * *